(12) United States Patent
Brodie et al.

(10) Patent No.: US 7,880,132 B2
(45) Date of Patent: Feb. 1, 2011

(54) CAP INCLUDING A HOUSING AND OPTICALLY TRANSPARENT MEMBER TO PROTECT A CAMERA MODULE LENS

(75) Inventors: Stuart Brodie, Edinburgh (GB); Hazel McInnes, Fife (GB); Kum Weng Loo, Singapore (SG); Mickael Miglietti, Saint Egreve (FR); Eric Saugier, Lancey (FR)

(73) Assignees: STMicroelectronics (Research & Development) Limited, Marlow-Buckinghamshire (GB); STMicroelectronics Pte Ltd, Singapore (SG); STMicroelectronics SA, Crolles (FR)

( * ) Notice: Subject to any disclaimer, the term of this patent is extended or adjusted under 35 U.S.C. 154(b) by 79 days.

(21) Appl. No.: 11/872,226

(22) Filed: Oct. 15, 2007

(65) Prior Publication Data
US 2009/0057544 A1 Mar. 5, 2009

(30) Foreign Application Priority Data
Oct. 13, 2006 (EP) .................................. 06270090

(51) Int. Cl.
*H01J 5/02* (2006.01)
*H04N 5/225* (2006.01)
*G03B 17/00* (2006.01)
*G02B 7/02* (2006.01)
(52) U.S. Cl. ........................ 250/239; 348/340; 396/529; 359/819

(58) Field of Classification Search .................. 250/239; 348/335, 340, E5.027, E5.028, E5.024, 294, 348/362, 373–376; 396/529; 359/819; 257/432–434
See application file for complete search history.

(56) References Cited

U.S. PATENT DOCUMENTS

| 5,673,083 | A  | * | 9/1997  | Izumi et al. ................. 348/340 |
| 6,834,161 | B1 | * | 12/2004 | Stiehler ...................... 396/103 |
| 2001/0012073 | A1 | * | 8/2001  | Toyoda et al. ............... 348/335 |
| 2002/0145676 | A1 | * | 10/2002 | Kuno et al. .................. 348/340 |
| 2004/0119870 | A1 |   | 6/2004  | Yoshida et al. .............. 348/335 |
| 2004/0165095 | A1 |   | 8/2004  | Shimizu et al. ............. 348/335 |
| 2005/0048692 | A1 |   | 3/2005  | Hanada et al. .............. 438/106 |
| 2005/0141106 | A1 | * | 6/2005  | Lee et al. ..................... 359/808 |
| 2006/0042064 | A1 | * | 3/2006  | Montfort et al. ........... 29/407.1 |
| 2006/0216014 | A1 | * | 9/2006  | Morinaga et al. ........... 396/144 |

FOREIGN PATENT DOCUMENTS

EP        1691227        8/2006

* cited by examiner

*Primary Examiner*—Thanh X Luu
(74) *Attorney, Agent, or Firm*—Lisa K. Jorgenson; Allen, Dyer, Doppelt, Milbrath & Gilchrist, P.A.

(57) ABSTRACT

A camera module lens cap is provided to protect a camera module in a mobile device where the camera module is exposed. The camera module lens cap includes an optically transparent member for positioning adjacent a camera lens, and a housing for carrying the optically transparent member. The housing includes an overhanging lip for engaging a base of the camera module.

29 Claims, 8 Drawing Sheets

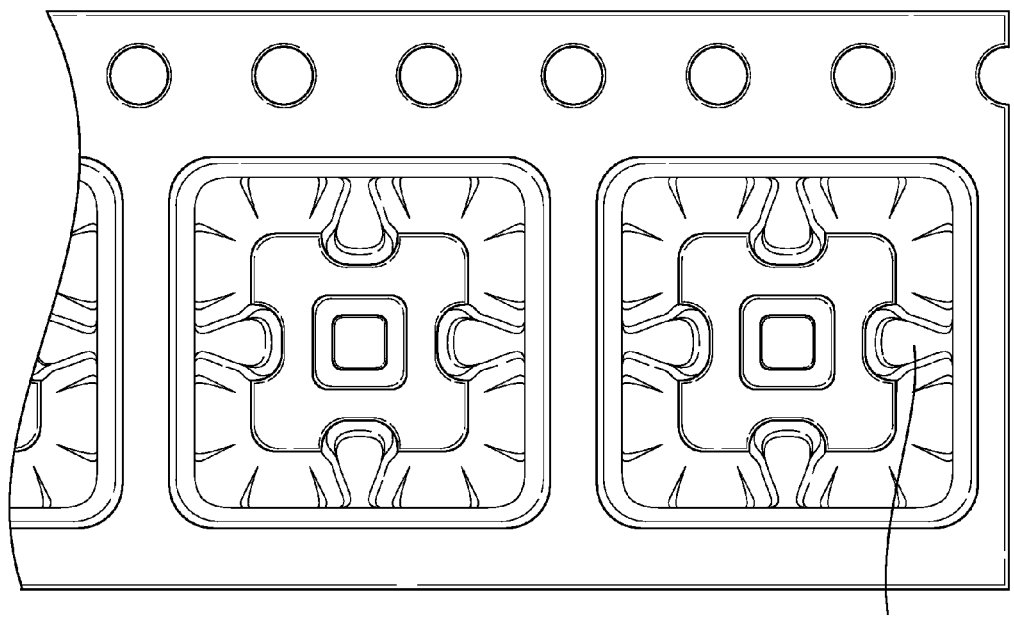
FIG. 7     34
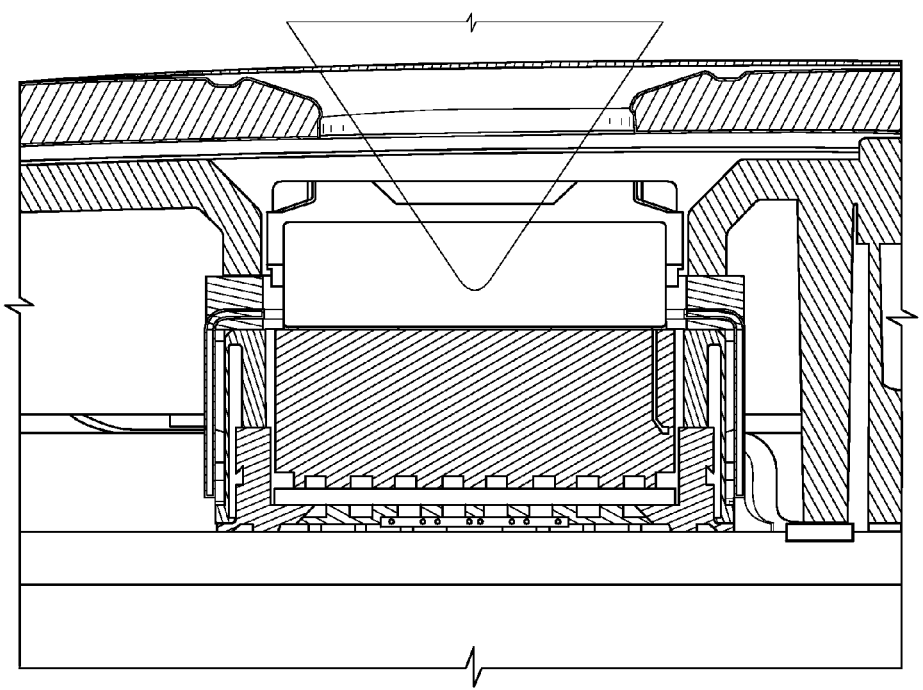
FIG. 8

CAP INCLUDING A HOUSING AND OPTICALLY TRANSPARENT MEMBER TO PROTECT A CAMERA MODULE LENS

FIELD OF THE INVENTION

The present invention relates to a camera module lens cap, and in particular, to a lens cap for a camera module of a solid state image sensor.

BACKGROUND OF THE INVENTION

The field of solid state image sensors is well established. CCD and CMOS sensors are found in a large number of devices from digital still cameras to mobile telephones, as well as in laptops, webcams, pointing devices and barcode readers to name but a few. Mobile devices include, but are not limited to, mobile telephones, smart phones, palmtops and personal digital assistants, for example.

A typical camera module for a solid state image sensor is shown in FIG. 1. It includes a base 10, which can also be called a mount, and a barrel 12. In this example, the base 10 has a lower pedestal portion and an upper cylindrical portion which encases the barrel 12. A lens (not shown) is housed within the barrel 12, and the barrel moves vertically to adjust the focus. The lens 14 focuses incident light onto an image sensing integrated circuit 16, typically formed by a CMOS process. When packaging the camera module within a mobile device, it is important to protect the module and its components from being damaged by the end user or from entry of dust or other contamination. If the lens is exposed it can be scratched, and if the barrel 12 is exposed, any forces applied to it can make it move and interfere with the correct focusing of the camera module.

Traditionally, mobile devices have been constructed with a protective cover integrated into the casing to prevent damage and scratching to the camera module. However, with the abovementioned pressures on form factor and for other manufacturing reasons, some manufacturers prefer to omit this cover and leave the module exposed. In this case, a known way of protecting the module from exposure is to provide a circular glass or plastic fixture mounted on top of the barrel, usually fixed in place with an adhesive washer or with a glue material.

However, this method of protection presents a number of practical disadvantages. The fixture has a low mechanical strength when shear forces are applied, and forces applied to it will translate into the barrel and may move the focus of the module. Adhesive washers are a nonpermanent method, and can be peeled off by an end user. Glue and adhesive tend to be more susceptible to environmental conditioning, and do not perform well in drop tests. Furthermore, circular glass is relatively expensive compared to regular shapes such as squares or rectangles. This is due to the extra steps required to grind the edges, and to the material that is wasted in its manufacture.

SUMMARY OF THE INVENTION

In view of the foregoing background, an object of the present invention is to provide a lens cap for a camera module of a solid state image sensor with a reduced form factor without compromising on the effective packaging of components to ensure robust operation.

This and other objects, advantages and features in accordance with the present invention are provided by a camera module lens cap comprising an optically transparent member for positioning over a lens, and a housing comprising an overhanging lip that engages with a base of a camera module.

The housing may comprise a central aperture, and may be circular in shape. The optically transparent member may comprise a square member that may be formed from a glass material. The square member may be fitted to an underside of the housing, and may rest on four corners of the cylindrical portion of the base.

The optically transparent member and the housing may be a one piece construction, such as being formed as a unitary molded plastic member. The housing may be painted and/or textured on to render it optically opaque. The optically transparent member may be coated with a toughening or a protection material.

The lip may extend part way down a cylindrical portion of the housing. The lip may also rest on a pedestal portion of the housing.

The optically transparent portion may be coated with an anti-reflection coating. The housing may comprise apertures on an upper surface for the entry of adhesive.

The housing may comprise slots on a bottom edge of the lip for locating the cap in a tape and reel carrier. The housing may comprise indents on a top surface for locating the cap in a holder for a glass attachment. Two opposing indents may be provided which have different angles of inclination.

According to a second aspect, a mobile device comprises a camera module fitted with the lens cap as described above. The camera module lens cap may be loosely fitted with a casing portion of the mobile device.

Further aspects are directed to providing a mobile telephone, laptop computer, webcam, digital still camera, camcorder, optical mouse and barcode reader that comprises a camera module fitted with the lens cap as described above. These are all types of mobile devices according to the second aspect.

BRIEF DESCRIPTION OF THE DRAWINGS

The present invention will now be described, by way of example only, with reference to the accompanying drawings in which:

FIG. 7 shows a tape and reel strip for holding lens caps during a manufacturing process according to the present invention;

FIG. 8 shows a mobile telephone incorporating a camera module provided with the lens cap of FIG. 2.

DETAILED DESCRIPTION OF THE PREFERRED EMBODIMENTS

Figure 1:
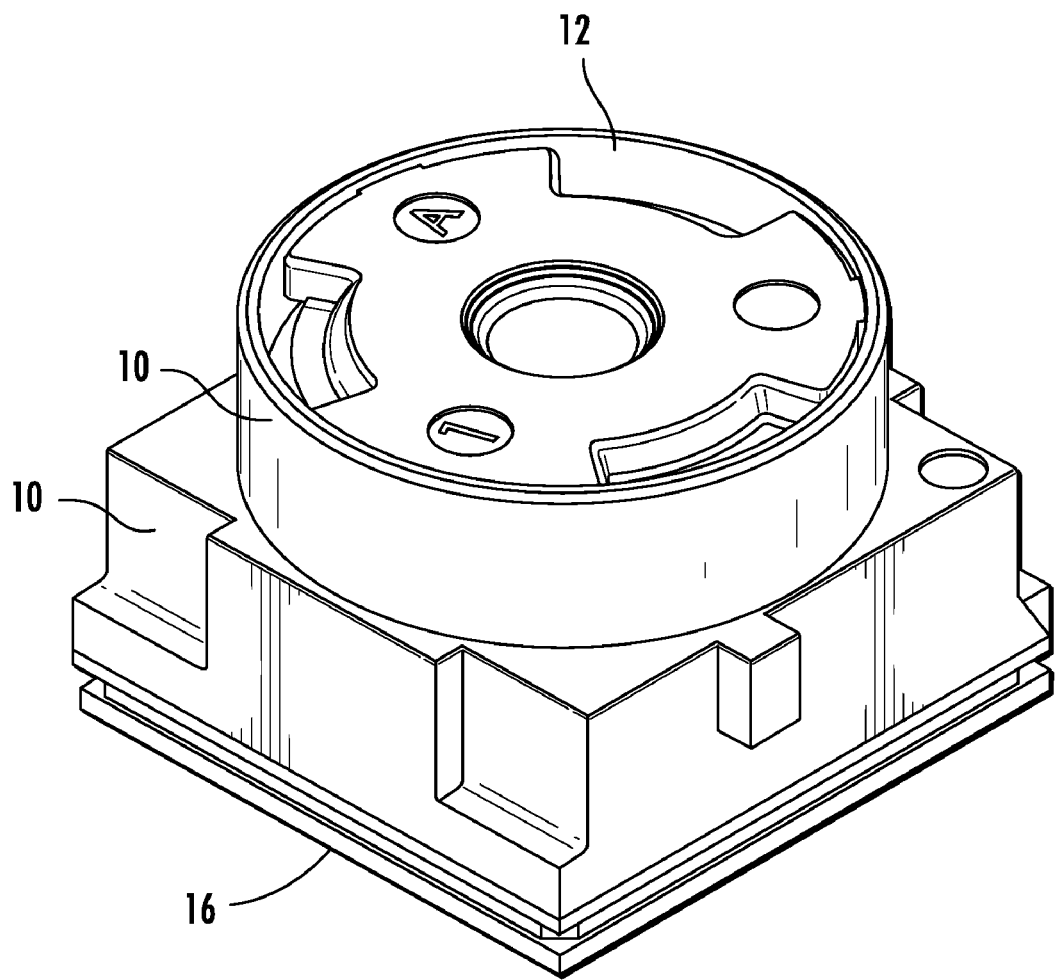
FIG. 1 illustrates a typical camera module according to the prior art.
Figure 2:
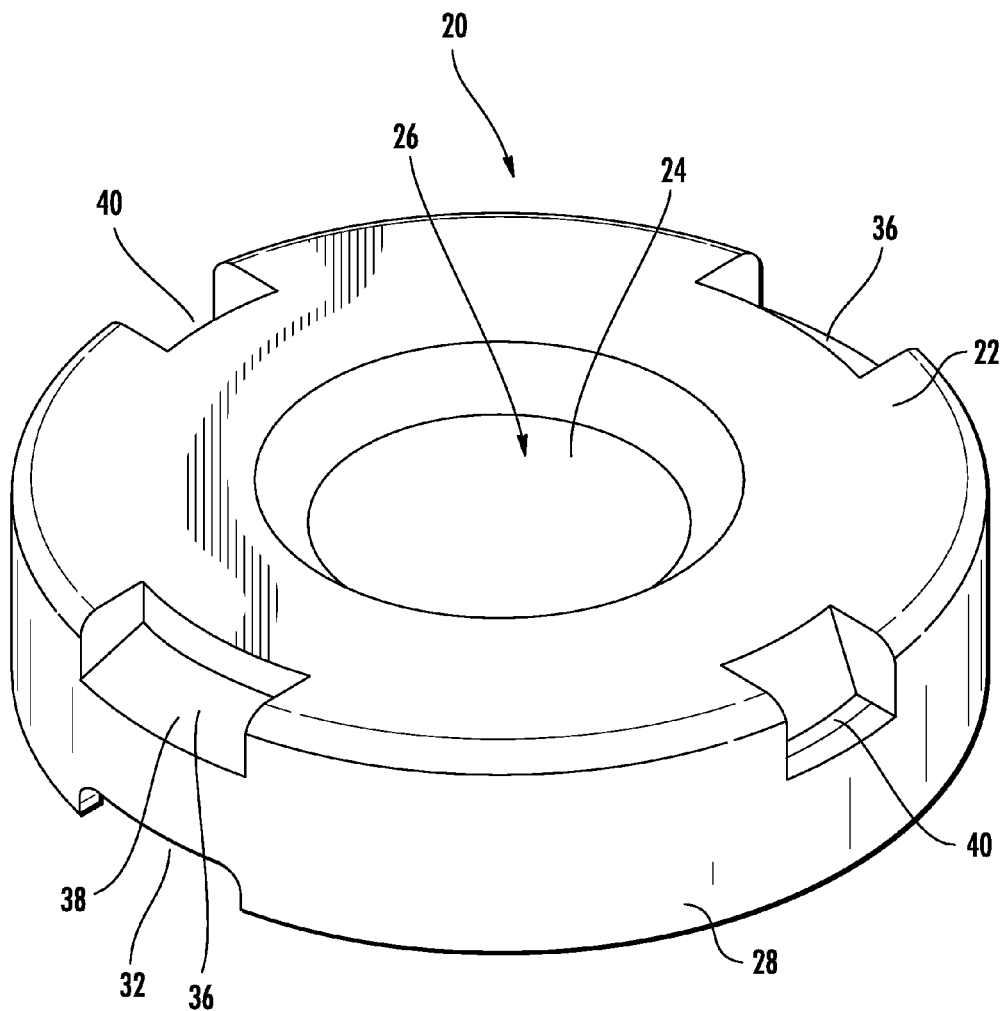
FIG. 2 shows a lens cap according to a first embodiment of the present invention.

A first embodiment of a lens cap is illustrated with reference to FIGS. 2 to 8. As shown in FIG. 2, the lens cap 20 comprises a housing 22 and an optically transparent member 24. The housing 22 comprises a one piece plastic molding formed from a material such as a liquid crystalline polymer (LCP), and includes an aperture 26 for the transmission of light. The housing 22 further comprises an overhanging lip portion 28.

Figure 3:
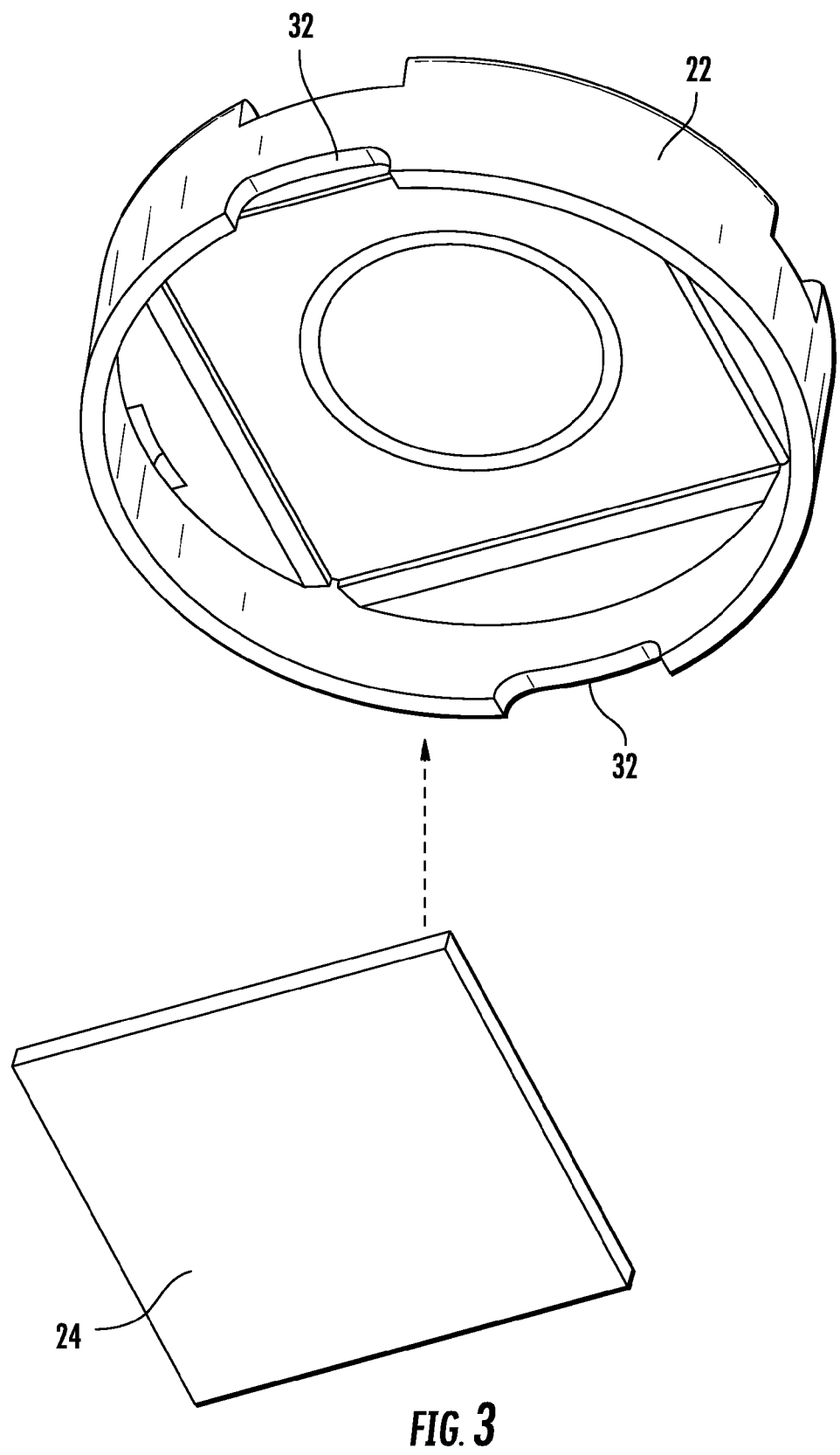
FIG. 3 shows the location of an optically transparent member within the lens cap of FIG. 2.

As can be more clearly shown in FIG. 3, the optically transparent portion 24 comprises a square piece of optically transparent material, such as an appropriate glass or plastics material. The material is optionally coated with an anti-reflection coating on one or both sides for reducing the incidence of reflections in the images output by the image sensor. FIG. 3 shows how the square piece 24 is glued into place in the housing 22.

Figure 4:
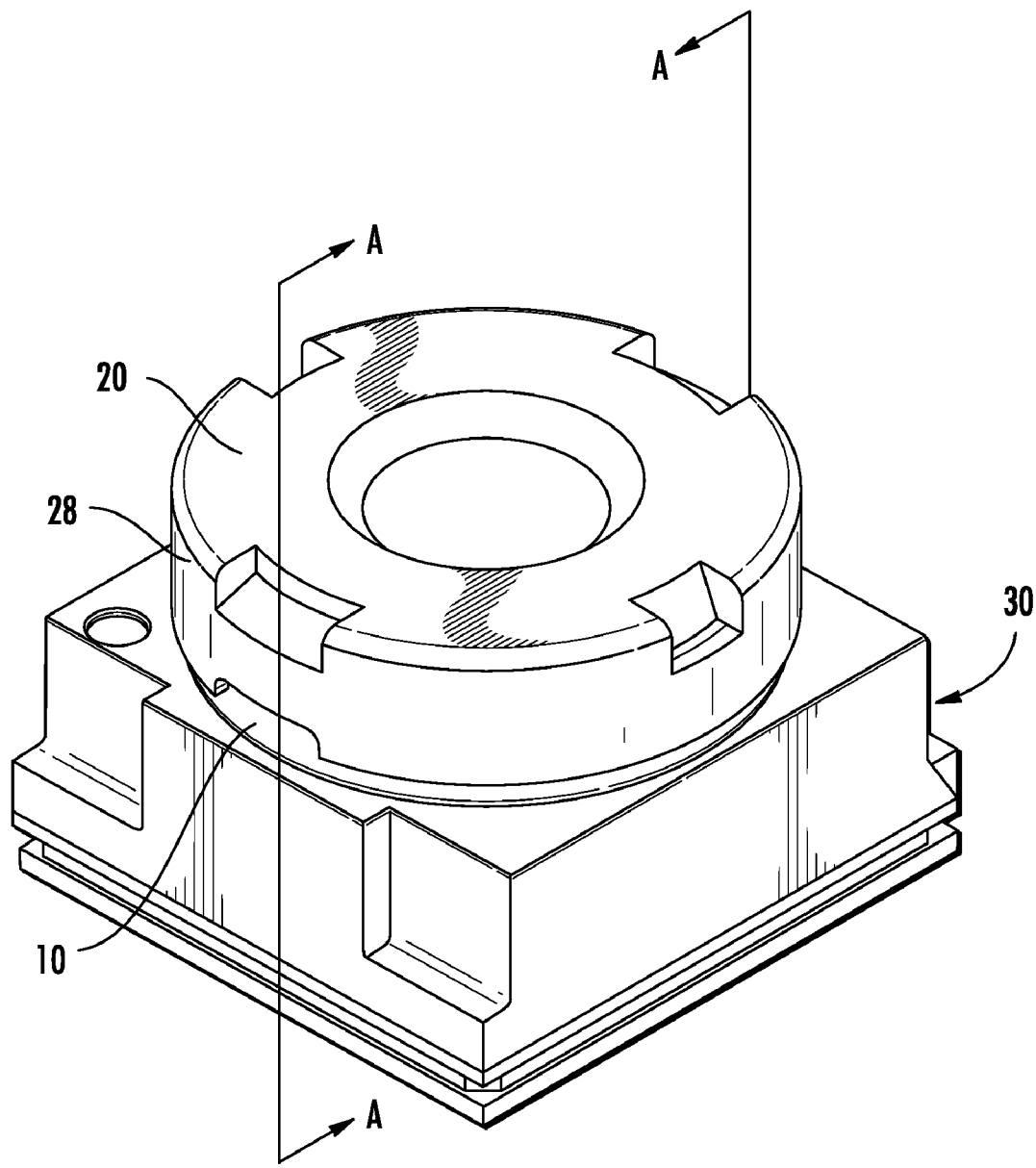
FIG. 4 shows an isometric view of the lens cap of FIG. 2 in position on a camera module.
Figure 5:
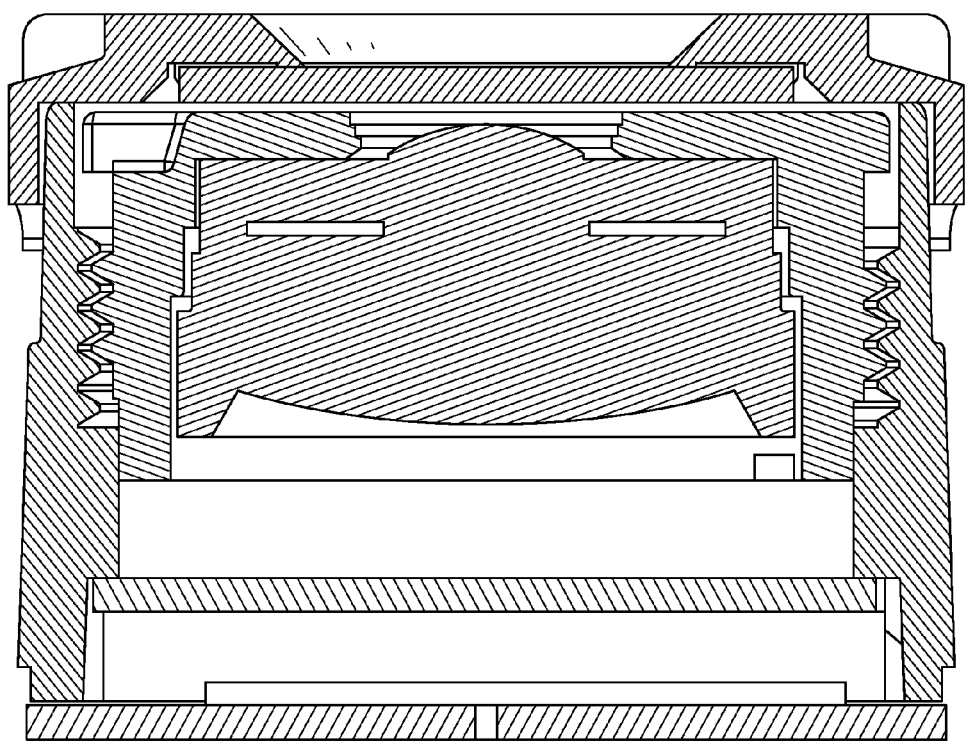
FIG. 5 is a cross-sectional view taken across line A-A shown in FIG. 4.

The lens cap 20 then covers a camera module 30 as shown in FIG. 4. The overhanging lip portion 28 is fixed or attached to the mount 10. This causes all forces applied to the cap 20 to be transmitted into the mount 10, thus shielding the barrel 12 and having no effect on the module's focusing. Also, because the overhanging lip 28 extends downwards, the cap 20 can withstand higher lateral forces as compared with a single piece circular member that is placed or fixed on top of the barrel or module. The overhanging lip 28 can be formed to extend further down the mount than illustrated in order to increase these effects, to any depth until it touches the pedestal portion of the base. An additional advantage of the overhanging design is to prevent dust from entering between the cap and barrel lenses.

Figure 6:
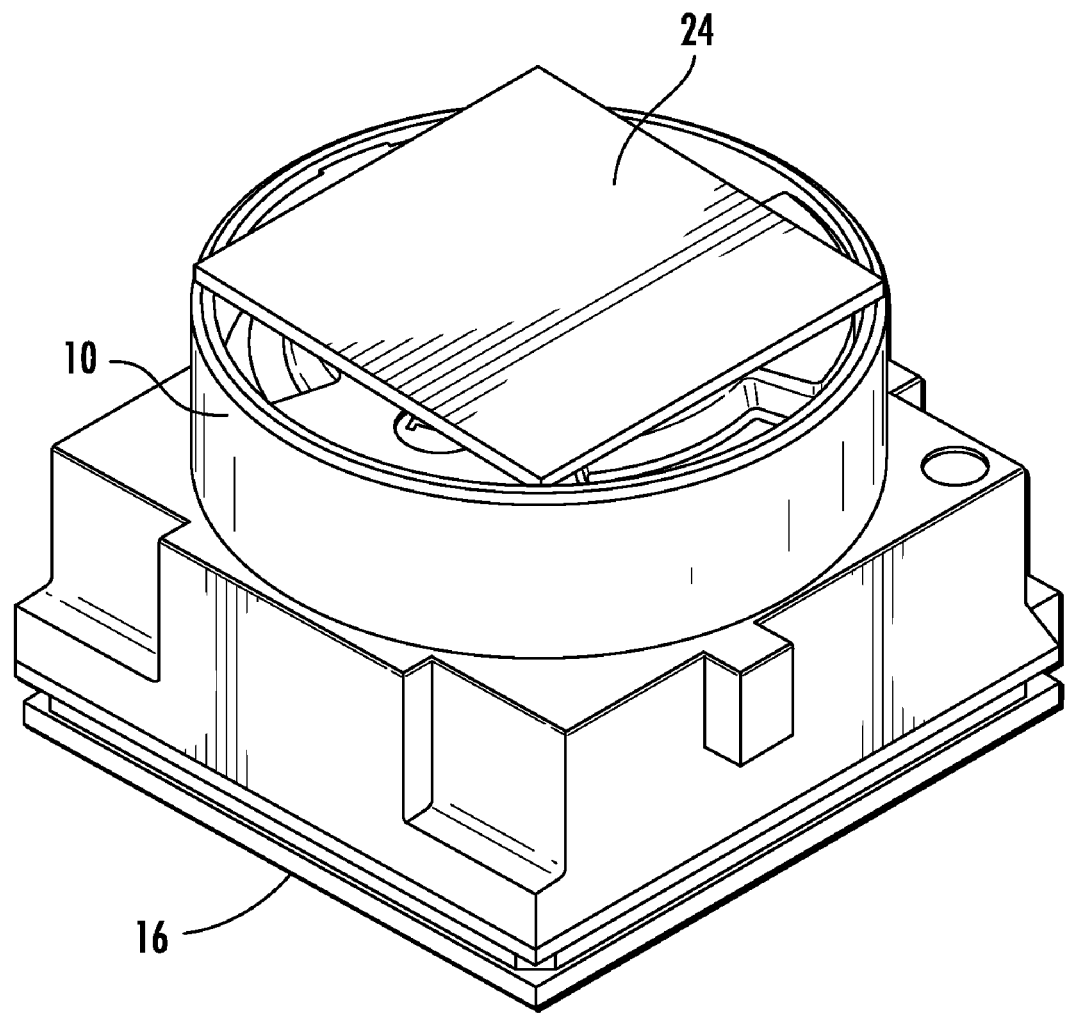
FIG. 6 is a cut away view showing the location of the optically transparent member within the embodiment of FIG. 4.

Furthermore, the use of the square glass reduces cost as compared with the use of circular glass, as mentioned above. As can be seen in FIG. 6, the square glass can be arranged to sit on the mount in four corners to prevent the glass from being pushed out of the cap by the end user.

In an example of a process for manufacturing the camera module, the cap 20 is supplied in a tape and reel carrier and then taken out and placed onto a boat carrier, and glue is applied to the underside of the cap and the glass is set in place. The cap 20 is then mounted on the module and glue is applied to the mount.

The lens cap 20 can be advantageously provided with features to aid this manufacturing process. As seen in FIG. 2, two opposing slots 32 are provided on the bottom edge of the overhanging lip 28 which forces the cap 20 in position within a tape and reel cavity such as that shown in FIG. 7, by mating with the projections 34 seen in FIG. 7. This prevents the cap 20 from turning, thus ensuring consistent location for pick and place machinery used to process the cap 20. The cap 20 is also provided with slots 36 for locating the cap 20 in a holder for the glass attach step, or to a boat carrier. The surfaces 38 of the slots 36 are angled, and can be formed with different surface textures so that they reflect light differently, and can be distinguished from each other by the pick and place machinery.

The cap 20 can also be provided with two holes 40 on a top surface for the application of an adhesive for fixing using standard automation equipment and can easily be sealed afterwards to prevent dust or debris entry. The cap 20 can also optionally be provided with a lip on its underside to prevent glue from bleeding into the optical surface.

A mobile device incorporating a camera module with a lens cap is shown in FIG. 8. The cap 20 rather than the module itself is exposed so that the lens is protected, and the focus is not affected when the cap is subjected to forces as described above.

Figure 9:
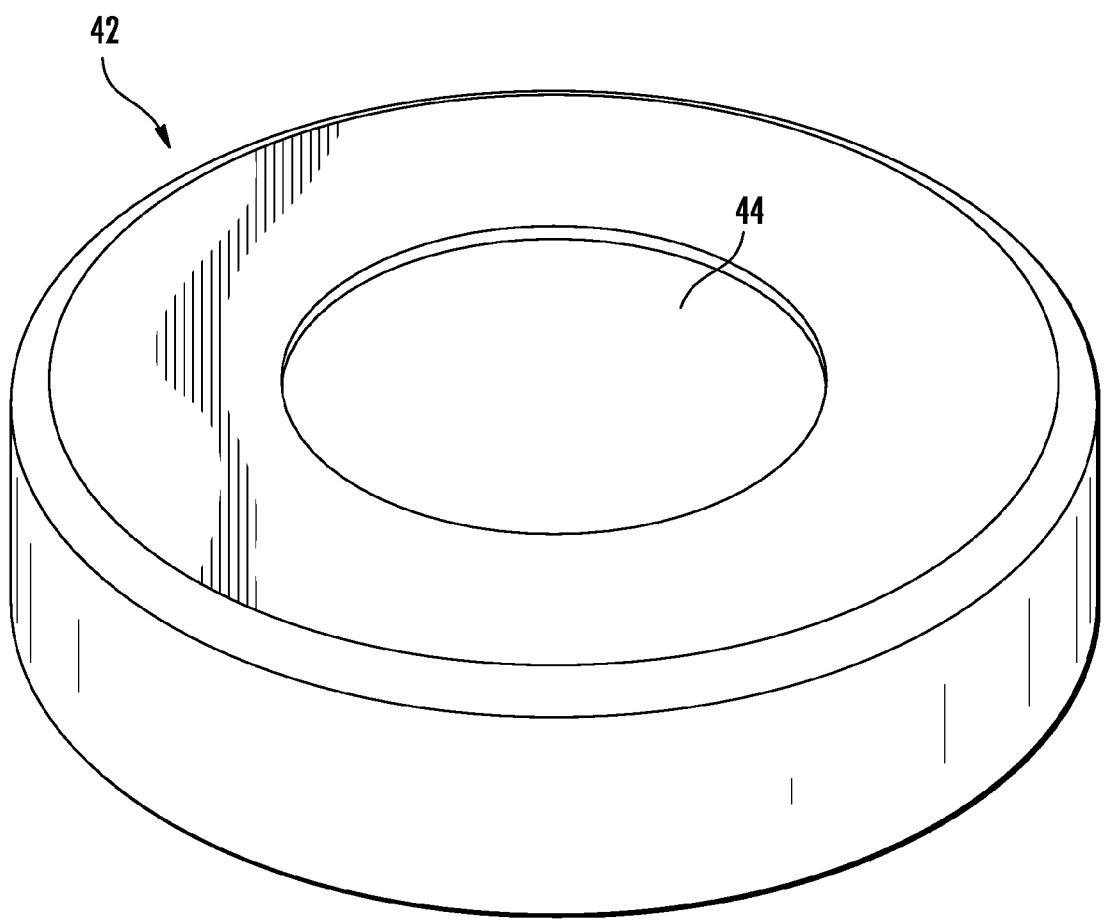
FIG. 9 shows a lens cap according to a second embodiment of the present invention.

A lens cap according to a second embodiment is shown in FIG. 9. Instead of a two piece plastic housing with glass insert, the cap 42 can be formed from a single piece of molded material, suitably a plastics material. Typically, an optically transparent plastic will be used, and then a portion will be rendered opaque by being painted or textured, leaving an optically transparent section 44 in a central portion. The optically transparent section 44 can then be coated with an anti-reflection coating, and can also be toughened to give it glass-like properties.

It will be apparent that the cap 42 of the second embodiment shares the same advantages of the cap 20 of the first embodiment. These are directly transferable and so will not be described in detail herein.

It is to be appreciated that the lens cap could be applied to any camera module, whether or not the module would actually be exposed without the cap, and irrespective of the type of device in which it is used. That is, it is not restricted for use in mobile devices. Examples of mobile devices for which the lens cap could be used include a mobile telephone, laptop computer, webcam, digital still camera, optical mouse or barcode reader. It will be apparent to those skilled in the art on how to incorporate the lens cap into these products without further explanation being needed herein. The exact fit of the module and cap will depend on the topology of a particular device.

Various improvements and modifications can be made to the above without departing from the scope of the invention.

That which is claimed:

1. A camera module lens cap comprising:
    an optically transparent member having a rectangular shape;
    a housing adjacent said optically transparent member and including an aperture positioned over said optically transparent member, and comprising an overhanging lip for engaging a base of a camera module so that said optically transparent member is over a lens within the camera module; and
    said optically transparent member is on an underside of said housing and directly rests on outer perimeter edges of a cylindrical portion of the base of the camera module.

2. The camera module lens cap of claim 1, wherein the aperture is a circular aperture that is centrally positioned.

3. The camera module lens cap of claim 1, wherein said optically transparent member comprises glass.

4. The camera module lens cap of claim 1, wherein said housing is optically opaque.

5. The camera module lens cap of claim 1, further comprising a toughening material coating said optically transparent member.

6. The camera module lens cap of claim 1, wherein said housing includes a cylindrical portion, and the overhanging lip extends part way down the cylindrical portion of said housing.

7. The camera module lens cap of claim 1, wherein the base of the camera module includes a pedestal portion, and the overhanging lip rests on the pedestal portion of the base.

8. The camera module lens cap of claim 1, further comprising an anti-reflection coating on said optically transparent member.

9. The camera module lens cap of claim 1, further comprising an adhesive layer between said optically transparent member and said housing; and wherein the aperture on an upper surface of said housing allows entry of the adhesive layer.

10. The camera module lens cap of claim 1, wherein said housing comprises a plurality of slots on a bottom edge of the overhanging lip for locating the camera module lens cap in a tape and reel carrier.

11. The camera module lens cap of claim 1, wherein said housing comprises a plurality of indents on a top surface thereof for locating the camera module lens cap in a holder.

12. The camera module lens cap of claim 11, wherein the plurality of indents includes two opposing indents having different angles of inclination.

13. A mobile device comprising:
a camera module comprising a lens; and
a camera module lens cap for protecting said lens, and comprising
an optically transparent member having a rectangular shape,
a housing adjacent said optically transparent member and including an aperture centrally positioned over said optically transparent member, and comprising an overhanging lip for engaging a base of said camera module so that said optically transparent member is over said lens, and
said optically transparent member is on an underside of said housing and directly rests on outer perimeter edges of a cylindrical portion of the base of the camera module.

14. The mobile device of claim 13, wherein the mobile device is configured as at least one of the following: a cellular telephone, a laptop computer, a webcam, a digital still camera, a camcorder, an optical mouse and a barcode reader.

15. A method for protecting a lens in a camera module for a mobile device, the method comprising:
providing an optically transparent member having a rectangular shape;
coupling the optically transparent member to an underside of a housing that includes a circular aperture centrally positioned over the optically transparent member, the housing comprising an overhanging lip; and
positioning the overhanging lip of the housing for engaging a base of the camera module so that the optically transparent member is over the lens and directly rests on outer perimeter edges of a cylindrical portion of the base of the camera module.

16. The method of claim 15, wherein the housing includes a cylindrical portion and the base of the camera module includes a pedestal portion, and the overhanging lip extends part way down the cylindrical portion and rests on the pedestal portion of the base.

17. A camera module lens cap comprising:
an optically transparent member;
a housing adjacent said optically transparent member and including an aperture positioned over said optically transparent member, and comprising an overhanging lip for engaging a base of a camera module so that said optically transparent member is over a lens within the camera module, with the base of the camera module including a pedestal portion and the overhanging lip resting on the pedestal portion of the base; and
said optically transparent member is on an underside of said housing and directly rests on outer perimeter edges of a cylindrical portion of the base of the camera module.

18. The camera module lens cap of claim 17, wherein said optically transparent member comprises glass, and wherein said housing is optically opaque.

19. The camera module lens cap of claim 17, further comprising an anti-reflection coating on said optically transparent member.

20. The camera module lens cap of claim 17, wherein said housing comprises a plurality of slots on a bottom edge of the overhanging lip for locating the camera module lens cap in a tape and reel carrier.

21. A camera module lens cap comprising:
an optically transparent member;
a housing adjacent said optically transparent member and including an aperture positioned over said optically transparent member, and comprising an overhanging lip for engaging a base of a camera module so that said optically transparent member is over a lens within the camera module;
said optically transparent member is on an underside of said housing and directly rests on outer perimeter edges of a cylindrical portion of the base of the camera module; and
an adhesive layer between said optically transparent member and said housing, with the aperture positioned on an upper surface of the housing to allow entry of the adhesive layer.

22. The camera module lens cap of claim 21, wherein said optically transparent member comprises glass, and wherein said housing is optically opaque.

23. The camera module lens cap of claim 21, further comprising an anti-reflection coating on said optically transparent member.

24. The camera module lens cap of claim 21, wherein said housing comprises a plurality of slots on a bottom edge of the overhanging lip for locating the camera module lens cap in a tape and reel carrier.

25. A camera module lens cap comprising:
an optically transparent member;
a housing adjacent said optically transparent member and including an aperture positioned over said optically transparent member, said housing comprising a plurality of indents on a top surface thereof that includes two opposing indents having different angles of inclination for locating the camera module lens cap in a holder, and an overhanging lip for engaging a base of a camera module so that said optically transparent member is over a lens within the camera module; and
said optically transparent member is on an underside of said housing and directly rests on outer perimeter edges of a cylindrical portion of the base of the camera module.

26. The camera module lens cap of claim 25, wherein said optically transparent member comprises glass, and wherein said housing is optically opaque.

27. The camera module lens cap of claim 25, further comprising an anti-reflection coating on said optically transparent member.

28. The camera module lens cap of claim 25, wherein said housing comprises a plurality of slots on a bottom edge of the overhanging lip for locating the camera module lens cap in a tape and reel carrier.

29. A method for protecting a lens in a camera module for a mobile device, the method comprising:
providing an optically transparent member;
coupling the optically transparent member to an underside of a housing that includes a cylindrical portion and an aperture positioned over the optically transparent member, the housing comprising an overhanging lip; and
positioning the overhanging lip of the housing for engaging a base of the camera module so that the optically transparent member is over the lens and directly rests on outer perimeter edges of a cylindrical portion of the base of the camera module, with the base of the camera module including a pedestal portion, and the overhanging lip extending part way down the cylindrical portion and resting on the pedestal portion of the base.

* * * * *